United States Patent [19]

Kaduboski

[11] 4,129,686
[45] Dec. 12, 1978

[54] PRONGED ANODE COLLECTOR FOR INTERNALLY SHORTING GALVANIC CELLS

[75] Inventor: Mitchell J. Kaduboski, North Olmsted, Ohio

[73] Assignee: Union Carbide Corporation, New York, N.Y.

[21] Appl. No.: 851,961

[22] Filed: Nov. 16, 1977

[51] Int. Cl.$^2$ ............................................. H01M 2/34
[52] U.S. Cl. ........................................ 429/61; 429/66; 429/174
[58] Field of Search ................. 429/66, 122, 164, 174, 429/162, 178, 61

[56] References Cited

U.S. PATENT DOCUMENTS

| 2,499,239 | 2/1950 | Williams | 429/66 |
| 3,170,818 | 2/1965 | Horn et al. | 429/174 |
| 4,020,242 | 4/1977 | Okazaki et al. | 429/66 |
| 4,054,726 | 10/1977 | Sauer et al. | 429/66 |

FOREIGN PATENT DOCUMENTS 52-31328  3/1977  Japan.

Primary Examiner—Donald L. Walton
Attorney, Agent, or Firm—Cornelius F. O'Brien

[57] ABSTRACT

A galvanic cell employing a consumable anode, a cathode that expands during cell discharge and an electrolyte, wherein the improvement is the incorporation of a pronged anode collector partially embedded in the anode so that during discharge when the anode is partially consumed and the cathode expands, the expanded cathode will contact the prongs of the anode collector and internally short the cell thereby effectively eliminating any distortion in the housing for the cell.

18 Claims, 9 Drawing Figures

PRONGED ANODE COLLECTOR FOR INTERNALLY SHORTING GALVANIC CELLS

FIELD OF THE INVENTION

This invention relates to galvanic cells and specifically to such cells wherein the positive electrode expands during normal or abusive discharge and wherein a conductive member is electronically connected to the negative terminal of the cell and has at least one protruding segment embedded within the negative electrode. After substantial discharge of the cell or under abusive discharge conditions when the negative electrode is substantially consumed and the positive electrode expands, then the positive electrode will contact the conductive segment protruding from the negative electrode and internally short the cell thereby effectively controlling expansion of the positive electrode so as to prevent distortion of the overall dimensions of the cell.

BACKGROUND OF THE INVENTION

The battery has become a primary power source for many portable electronic devices such as radios, hearing aids, watches, calculators, and the like. In order to maintain the overall electronic devices as compact as possible, the electronic devices are usually designed with cavities to accommodate miniature batteries as their source of power. The cavities are usually made so that a battery can be snugly positioned therein thus making electronic contact with appropriate terminals within the device. A major potential problem in the use of battery powered devices of this nature is that if the battery bulges, it usually becomes wedged within the cavity of the device which sometimes can result in damage to the device. One cause of cell bulging or other distortion of the cell's overall physical dimensions is due to the expansion of the cathode during discharge or during abusive discharge conditions. For example, in nonaqueous lithium/solid cathode systems, the cathode may expand and move into the anode compartment of the cell during discharge. Especially with improperly balanced cell components or under abusive cell conditions, it is common for this cathode expansion to cause cell distortion (bulging) which, in turn, may cause damage to the electronic device in which the cell is used. Since this type of cell distortion is due to the physical expansion of the cathode, then a possible solution to minimize any overall cell distortion is to provide a void or cavity within the cell to accommodate the expansion of the cathode. Within electronic technology geared to miniaturization, it becomes necessary to package the power supply in a miniature type package so that the device it is to power can be reduced in size. Consequently, providing cavities within the cell system to accommodate any electrode expansion is not economically feasible.

It is, therefore, an important object of this invention to provide a compact cell structure that can halt the expansion of the positive electrode of the cell during discharge so as to effectively eliminate distortion of the cell's housing.

Another object of the present invention is to provide a means whereby after the positive electrode of a cell expands to a predetermined amount, the cell is adapted for providing an internal short thereby effectively preventing the distortion of the housing of the cell.

Another object of the present invention is to provide a nonaqueous lithium/solid cathode cell system having means for internally shorting the cell after the positive electrode has expanded a predetermined amount.

Another object of the present invention is to provide a conductive member within a cell which is disposed so as to internally short the cell when the positive electrode expands a predetermined amount.

Another object of the present invention is to provide a pronged current collector disposed within the cell so that upon expansion of the positive electrode to a predetermined amount and partial consumption of the negative electrode, the positive electrode will contact the pronged current collector, will pierce the separator and contact the positive electrode, thereby internally shorting the cell.

The foregoing and additional objects will become more fully apparent from the following description and the accompanying drawings.

SUMMARY OF THE INVENTION

The invention relates to a galvanic cell having a consumable negative electrode (anode), a positive electrode (cathode) that expands during cell discharge or as the result of abusive discharge, a separator between said negative electrode and said positive electrode, and an electrolyte housed within a two-part conductive container, the first part of the conductive container being electronically connected to the negative electrode, the second part of the container being electronically connected to the positive electrode and wherein said first part and said second part of the container are electronically insulated from each other; the improvement wherein a conductive member is disposed between the negative electrode and the first part of the container, said conductive member being electronically connected to the first part of the container and having at least one segment embedded within the negative electrode such that upon substantial electrochemical consumption of the negative electrode and expansion of the positive electrode to a predetermined amount during discharge of the cell, the protruded segment of the conductive member will be disposed to contact the positive electrode so as to internally short the cell.

As used herein, the term "consumable negative electrode" shall mean an electrode that is electrochemically oxidized during cell discharge, thereby resulting in a change in its contour, for example a shrinkage or reduction in thickness.

As used herein, the term "positive electrode" shall mean an electrode that is electrochemically reduced and increases in volume during discharge.

As used herein, the term "conductive member" shall mean a conductive material that will be compatible or stable in contact with the particular components of the cell system. Suitable conductive materials could comprise nickel, stainless steel, aluminum, nickel-plated steel or the like. Since the negative electrode may shrink and the positive electrode will expand during discharge of the cell, the segment of the conductive member should initially penetrate into the negative electrode by a distance such that it will be disposed to contact the expanded positive electrode only after the cell has been substantially discharged. For example, the projected segment of the conductive member should penetrate into the negative electrode by a distance that would require the negative electrode to be at least about 75% and preferably above about 90% electrochemically consumed before the extremity of the conductive segment is exposed at the face of negative electrode sufficient to pierce through the separator. This will insure that the cell will be at least substantially discharged before it is internally shorted. For negative electrodes that substantially maintain their contour during discharge or for cells which may bulge prematurely, it may be desirable to have only a portion of the projected segment embedded within the negative electrode so that upon expansion of the positive electrode, it will force the negative electrode via the separator back against the base of the conductive member, thereby further embedding the projected segment within the negative electrode. Thus during discharge of these types of cells, the projected segments will be disposed so as to pierce the separator and contact the positive electrode. In general, the penetration of the conductive segments into the negative electrode shall be sufficient such that the expansion of the positive electrode will not distort the housing of the cell to a degree that it will damage the device in which it is employed. In addition, by substantially eliminating the distortion of the cell's housing due to the positive electrode expansion, the seal of the cell can be effectively maintained during the useful life of the cell.

The present invention is ideally suited for use in nonaqueous lithium/solid cathode systems in which the positive electrode expands and moves into the anode compartment during discharge. Especially, with improperly balanced cells or other abuse discharge conditions, it is common for this expansion to cause cell distortion which, in turn, may damage the electronic device in which the cell is employed. By employing a conductive member as a current collector in accordance with the present invention, the expansion of the positive electrode can be terminated by internally shorting the system. The projection of a segment of the conducting member into the negative electrode should be designed so that after a specific expansion of the positive electrode into the negative cavity of the cell, the positive electrode will electronically contact the negative electrode and internally short the cell. The cell voltage will immediately drop and within a short period of time the electrode-separator interfaces will become dry. During the period of the internal short, the negative electrode will continue to discharge until consumed and the nature of the discharge product will be altered so that the cathode expansion will also be altered so as to effectively eliminate any distortion of the cell's housing.

In nonaqueous cell systems suitable active cathode materials would include $CF_x$, metal oxides such as $V_2O_5$, $WO_3$, $MoO_3$, lead oxides, (e.g. $Pb_3O_4$ and PbO), cobalt oxides, $MnO_2$, copper oxides (e.g. CuO), etc., metal sulfides such as CuS, $CoS_2$, $In_2S_3$, FeS, $FeS_2$, NiS, metal chromates such as $Ag_2CrO_4$, metal phosphates such as $Ag_3PO_4$, and metal sulfates such as $CuSO_4$.

Highly active negative electrodes for use in nonaqueous systems according to this invention would be consumable metals and include aluminum, the alkali metals, alkaline earth metals and alloys of alkali metals or alkaline earth metals with each other and other metals.

The term "alloys" as used herein and in the appended claims is intended to include mixtures, solid solutions such as lithium-magnesium, and intermetallic compounds such as lithium monoaluminide. The preferred negative materials are lithium, sodium, potassium, calcium, magnesium and alloys thereof. Of the preferred anode materials lithium would be the best because in addition to being a ductile metal that can be easily be assembled in a cell, it possesses the highest energy-to-weight ratio of the group of suitable negative electrodes.

In nonaqueous cells, useful organic solvents employed alone or mixed with one or more other solvents for use in preparing electrolytes employed in the cell of this invention include the following classes of compounds:

Alkylene nitriles: e.g., crotonitrile (liquid range −51.1° C. to 120° C.)

Trialkyl borates: e.g., trimethyl borate, $(CH_3O)_3B$ (liquid range −29.3° to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range −17° to 100.8° C.)

Alkylnitriles: e.g., acetonitrile, $CH_3CN$ (liquid range −45° to 81.6° C.)

Dialkylamides: e.g., dimethylformamide, $HCON(CH_3)_2$ (liquid range −60.48° to 149° C.)

Lactams: e.g., N-methylpyrrolidone,

(liquid range −16° to 202° C.)

Tetraalkylureas: e.g., tetramethylurea, $(CH_3)_2N—CO—N(CH_3)_2$ (liquid range −1.2° to 166° C.)

Monocarboxylic acid esters: e.g., ethyl acetate (liquid range −83.6° to 77.06° C.)

Orthoesters: e.g., trimethylorthoformate, $HC(OCH_3)_3$ (boiling point 103° C.)

Lactones: e.g., γ-(gamma) butyrolactone,

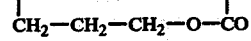

(liquid range −42° to 206° C.)

Dialkyl carbonates: e.g., dimethyl carbonate, $OC(OCH_3)_2$ (liquid range 2° to 90° C.)

Alkylene carbonates: e.g., propylene carbonate,

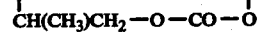

(liquid range −48° to 242° C.)

Monoethers: e.g., diethyl ether (liquid range −116° to 34.5° C.)

Polyethers: e.g., 1,1- and 1,2-dimethoxyethane (liquid ranges −113.2° to 64.5° C. and −58° to 83° C., respectively)

Cyclic ethers: e.g., tetrahydrofuran (liquid range −65° to 67° C.); 1,3-dioxolane (liquid range −95° to 78° C.)

Nitroaromatics: e.g., nitrobenzene (liquid range 5.7° to 210.8° C.)

Aromatic carboxylic acid halides: e.g., benzoyl chloride (liquid range 0° to 197° C.); benzoyl bromide (liquid range −24° to 218° C.)

Aromatic sulfonic acid halides: e.g., benzene sulfonyl chloride (liquid range 14.5° to 251° C.)

Aromatic phosphonic acid dihalides: e.g., benzene phosphonyl dichloride (boiling point 258° C.)

Aromatic thiophosphonic acid dihalides: e.g., benzene thiophosphonyl dichloride (boiling point 124° C. at 5 mm.)
Cyclic sulfones: e.g., sulfolane,

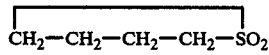

(melting point 22° C.); 3-methylsulfolane (melting point −1° C.)
Alkyl sulfonic acid halides: e.g., methanesulfonyl chloride (boiling point 161° C.)
Alkyl carboxylic acid halides: e.g., acetyl chloride (liquid range −112° to 50.9° C.); acetyl bromide (liquid range −96° to 76° C.); propionyl chloride (liquid range −94° to 80° C.)
Saturated heterocyclics: e.g., tetrahydrothiophene (liquid range −96° to 121° C.); 3-methyl-2-oxazolidone (melting point 15.9° C.)
Dialkyl sulfamic acid halides: e.g., dimethyl sulfamyl chloride (boiling point 80° C. at 16 mm.)
Alkyl halosulfonates: e.g., ethyl chlorosulfonate (boiling point 151° C.)
Unsaturated heterocyclic carboxylic acid halides: e.g., 2-furoyl chloride (liquid range −2° to 173° C.)
Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)
Esters and/or halides or dibasic carboxylic acids: e.g., ethyl oxalyl chloride (boiling point 135° C.)
Mixed alkyl sulfonic acid halides and carboxylic acid halides: e.g., chlorosulfonyl acetyl chloride (boiling point 98° C at 10 mm.)
Dialkyl sulfoxides: e.g., dimethyl sulfoxide (liquid range 18.4° to 189° C.)
Dialkyl sulfates: e.g., dimethylsulfate (liquid range −31.75° to 188.5° C.)
Dialkyl sulfites: e.g., dimethylsulfite (boiling point 126° C.)
Alkylene sulfites: e.g., ethylene glycol sulfite (liquid range −11° to 173° C.)
Halogenated alkanes: e.g., methylene chloride (liquid range −95° to 40° C.); 1,3-dichloropropane (liquid range −99.5° to 120° C.)

Of the above, the preferred solvents are sulfolane; crotonitrile; nitrobenzene; tetrahydrofuran; 1,3-dioxolane; 3-methyl-2-oxazolidone; propylene and ethylene carbonate; γ-butyrolactone; ethylene glycol sulfite; dimethylsulfite; dimethyl sulfoxide; and 1,1- and 1,2-dimethoxyethane. Of the preferred solvents, the best are 3-methyl-2-oxazolidone; propylene and ethylene carbonate, 1,2-dimethoxyethane and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., LiCF$_3$SO$_3$ or LiClO$_4$ which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 - July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

In nonaqueous lithium/solid cathode systems, an additional benefit for the use of the conductive member of the invention has been realized. Specifically, in the prior art construction of miniature nonaqueous button cells, a lithium anode disc was pressed into an expanded metal grid current collector which was previously attached to one part of a two-part container housing. When the assembled cell produced using this type of anode-container arrangement was discharged, a fluctuating voltage was exhibited or the cell failed with less than three-quarters of the cell's capacity expended. Examination of the cells revealed corrosion layers at the lithium/collector grid interface which resulted in poor electronic contact between the lithium and the anode terminal. The use of a conducting member electronically connected to the cell's negative terminal and having segments penetrating the lithium in accordance with the present invention will insure good electronic contact between the lithium and the terminal of the cell since the lithium will smear on the penetrating segments of the conductive member thereby providing a protecting layer on said segments.

This invention is also useful in certain aqueous systems such as those employing, for example, manganese dioxide. Suitable negative electrodes for use in aqueous systems would include, for example, zinc. Suitable aqueous electrolytes would include alkaline electrolytes, such as the aqueous solutions of the hydroxides of potassium and/or lithium.

A separator for use in this invention has to be chemically inert and insoluble in the cell system and have a porosity so as to permit the liquid electrolyte to permeate through and contact the negative electrode of the cell, thus establishing an ion transfer path between the negative and positive electrodes.

The two-part container housing for the cell could be made of stainless steel, iron, nickel, nickel-plated steel, or some other conductive material that will not corrode or otherwise deteriorate when in contact with the cell materials.

The insulating member disposed between the cover and the can has to be stable in the presence of the cell components and can be selected from such materials as polytetrafluoroethylene (e.g., "Teflon"), fluorinated ethylene-propylene (e.g., FEP), ethylene copolymer with FEP (e.g., "Tefzel"), chlorotrifluoroethylene (e.g., "Kel-F"), perfluoro-alkoxy polymer (e.g., PFA), tetra-fluoroethylene (TFE), polyvinyl, polyethylene, polypropylene, polystyrene, nylon, etc.

The present invention will become apparent from the following description thereof when considered together with the accompanying drawings which are set forth as being exemplary of embodiments of the present invention and are not intended, in any way, to be limitative thereof and wherein.

Figure 1:
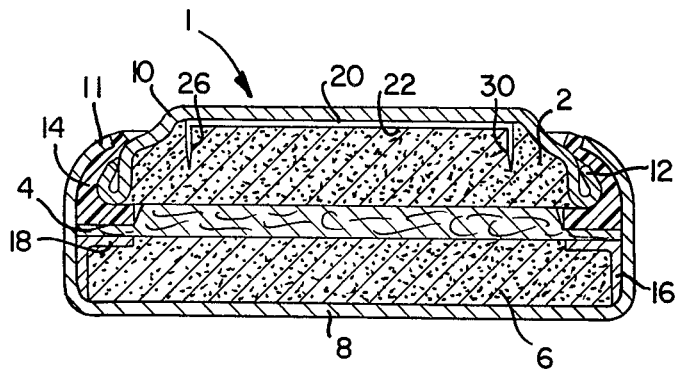
FIG. 1 is a sectional elevational view taken through an assembled button cell showing a conductive member electronically connected to the cover of the cell and having extended prongs penetrating into the negative electrode of the cell in accordance with this invention.

Referring to FIG. 1, there is shown a sectional elevation of a button cell 1 having a negative electrode(anode)2, separator 4, and positive electrode (cathode) 6 housed within a two-part container comprising a cathode container 8 and anode cup 10. As shown, cathode container 8 has a flange 11 which is crimped inwardly towards a U-shaped flange 12 of anode cup 10 via gasket 14 during assembly to seal the cell according to the principles disclosed in U.S. Pat. No. 3,069,489. As stated above, the gasket may be made of a suitable resilient electrolyte resistant material, such as neoprene, nylon, polypropylene or the like.

The separator 4 may be a polypropylene or a cellulosic member. An electrolyte is absorbed by the separator 4 and also a portion of it could be mixed in with the cathode mix forming the cathode of the cell. When using a cathode mix, a support ring 16 may be disposed in the cell adjacent the upstanding wall of the cathode container 8 and having an inwardly extended flange member 18 for supporting the separator 4. The support member is primarily employed to provide a rigid backup member as a support for cathode 6 and thus prevent cathode 6 from being compressed during the sealing of the cell.

Figure 2:
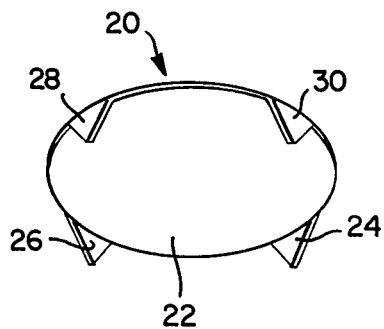
FIG. 2 is perspective view of the conductive member shown in FIG. 1.

A conductive member 20 as shown in FIG. 2 comprises a disc 22 having four peripheral extending prongs or segments 24, 26, 28 and 30 extending substantially perpendicular from the plane of the disc 22. Although not shown, the extending prongs could be obtained by lancing and then bending a segment of the disc to provide an extending prong of the type shown in FIG. 5. It should be understood that the extending prongs could be located anywhere on the surface of the disc. This conductive member 20 is shown assembled in the cell of FIG. 1 such that the disc 22 is in electronic contact with the inner surface of the anode cup 10, and prongs 26 and 30 penetrate into the negative electrode 2 of the cell. As illustrated in FIG. 1, the prongs penetrate into negative electrode 2 by a predetermined amount such that by the time the positive electrode 6 expands sufficiently during discharge of the cell to contact the extremities of the prongs 24, 26, 28, 30, the cell's capacity would have been substantially expended.

Figure 3:
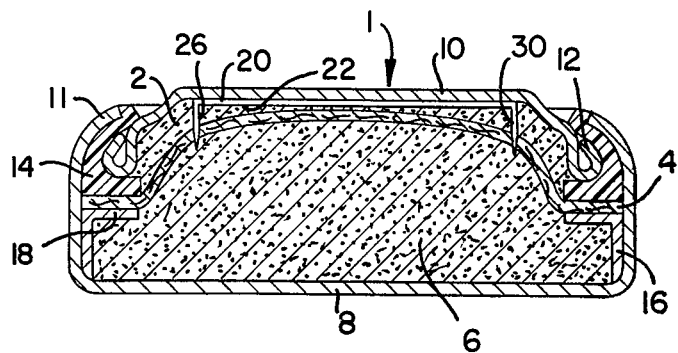
FIG. 3 is a sectional elevational view of the cell shown in FIG. 1 after the positive electrode has expanded to a degree such that it contacts the extremities of the projected prongs of the conductive member embedded in the negative electrode of the cell.

The cell of FIG. 1, after it has been substantially discharged, is shown in FIG. 3 and identical components are identified with the corresponding identical reference numbers. As illustrated in FIG. 3, after substantial capacity of the cell has been expended due to normal discharge or abusive discharge, the positive electrode 6 is shown expanded while negative electrode 2 is shown partially consumed. Thus during discharge the positive electrode 6 begins to fill the cavity formerly occupied by negative electrode 2. This continues until the expansion of positive electrode 6 forces the separator 4 against the diminishing negative electrode 2 to a degree wherein the extremities of the prongs 24, 26, 28, and 30 pierce separator 4 and directly short into the cathode 6 as shown in FIG. 3. The cell voltage will then drop immediately and within a short time the electrode-separator interfaces will become dry. During this time period, the negative electrode 2 continues to discharge until consumed and will not result in distortion of the housing of the cell.

Figure 4:
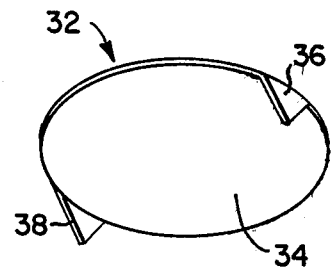
FIG. 4 is a perspective view of another embodiment of a conductive member for use in accordance with this invention.
Figure 5:
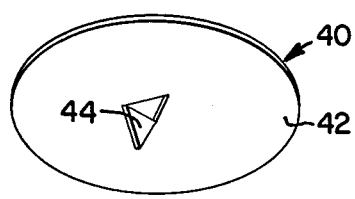
FIG. 5 is a perspective view of another embodiment of a conductive member for use in accordance with this invention.

The overall shape of the conductive member for use in this invention can vary widely as long as it is electronically connected to the cell's negative terminal and penetrates into the negative electrode as discussed above. For example, FIG. 4 shows a conductive member 32 comprising a disc 34 having two peripherally extending prongs 36 and 38 disposed 180° apart and oriented substantially perpendicular to the plane of the disc 34. FIG. 5 shows a conductive member 40 comprising a disc 42 having a surface disturbance at its center in which a projecting segment 44 is produced by lancing and bending so as to be disposed substantially perpendicular to the plane of disc 42.

Figure 6:
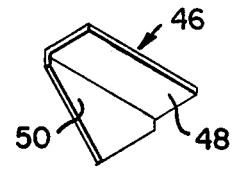
FIG. 6 is a perspective view of another embodiment of a conductive member for use in accordance with this invention.

FIG. 6 shows an L-shaped conductive member 46 having a first segment 48 adapted to electronically contact the negative terminal of a cell and a second segment 50, extending from and disposed approximately 90° to segment 48, adapted for insertion into the negative electrode of the cell.

Figure 7:
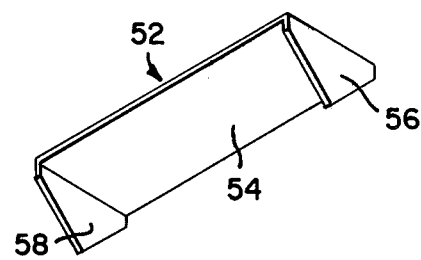
FIG. 7 is a perspective view of another embodiment of a conductive member for use in accordance with this invention.

FIG. 7 illustrates a two-prong conductive member 52 comprising a rectangular flat segment 54 having at its opposite ends extending prongs 56 and 58 disposed substantially perpendicular to segment 54. Surface segment 52 is adapted to electronically contact the negative terminal of the cell and the extending prongs 56 and 58 are adapted for piercing and being embedded within the negative electrode.

Figure 8:
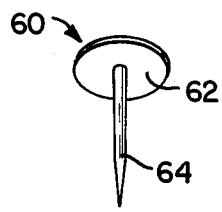
FIG. 8 is a perspective view of another embodiment of a conductive member for use in accordance with this invention.

FIG. 8 illustrates a tack-like conductive member 60 having a circular disc segment 62 and centrally located and protruding therefrom a prong member 64. The disc member 62 is adapted for electronically contacting the negative terminal of the cell and the prong 64 is adapted for penetrating and being embedded within a negative electrode.

The conductive member for use in this invention could comprise any flat base, for example, a disc, a square, a rectangle or a polygon, having extending therefrom at least one projected segment the plane of which is preferably disposed between about 45° and about 135° with respect to the base, preferably about 90°. When more than one segment projects from the base, the length of the segments need not be the same and may vary depending on their location. The base could be secured by any suitable means to the internal surface of the negative terminal (anode cup) so as to be electronically connected thereto. For example, the conductive members illustrated in FIGS. 2 and 4 through 8 could be welded to the inner surface of the negative terminal thereby firmly securing the conductive member to the negative terminal of the cell.

EXAMPLE

Three miniature button cells, 0.455 inch diameter and about 0.165 inch height (1.13 cm diameter and about 0.40 cm height), of the type shown in FIG. 1 were produced using a lithium anode disc, a bonded cathode mix containing $FeS_2$ as the active cathode material and a nonaqueous electrolyte consisting of a mixture of 30 volume per cent dimethoxyethane (DME), 30 volume per cent 3-methyl-2-oxazolidone (3Me2Ox) and 40 volume per cent dioxolane containing 1M $LiCF_3SO_3$ as the solute. These components were assembled in the cell as shown in FIG. 1 along with a polypropylene separator and a nylon gasket. The anode cup was nickel-plated stainless steel and the cathode container was nickel-plated steel. As shown in FIG. 1, a support ring made of stainless steel was assembled in the cell to provide a backup member during the sealing operation of the cell. A four prong anode collector member of the type shown in FIG. 2 was assembled in the cell so that the plane of the disc segment of the member was welded to the internal surface of the anode cup. The four projecting prongs were embedded in the negative lithium electrode as basically shown in FIG. 1.

Three additional button cells as shown in FIG. 1 were assembled using the same components except that the four prong anode collector was not employed and, instead, the lithium anode disc was pressed into an expanded nickel grid which was used as the anode collector and at the same time provided a member which was attached to the anode cup. All of the other components of the cells were identical to the components of the cells described above.

Figure 9:
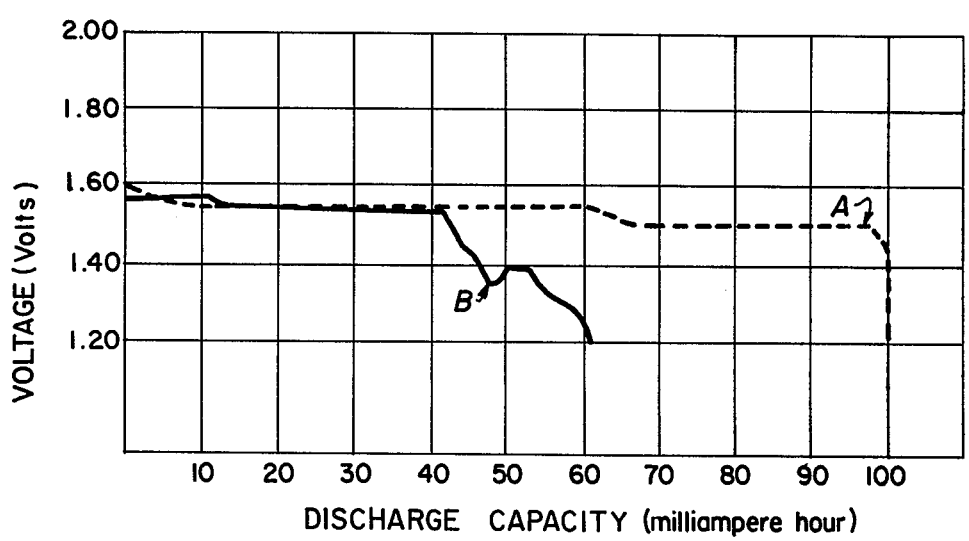
FIG. 9 is a graph illustrating the comparison of the discharge characteristics of a prior art button cell and a button cell made in accordance with this invention.

Each of the above cell types was discharged across a 15 K ohm load at 95° F and the milliampere hour output was recorded. The average milliampere hour output versus average output voltage curve for the three cells employing the four prong conductive member in accordance with this invention is shown plotted in FIG. 9 as curve A. The average milliampere hour output versus average output voltage curve for the three button cells of the prior art employing a lithium disc pressed into a nickel expanded grid is shown plotted in FIG. 9 as curve B. It is apparent that the average milliampere hour output of the cells made in accordance with this invention far exceeded the average milliampere hour output of corresponding cells of the prior art. It was also noted that the three cells incorporating the four prong conductive member did not show any distortion in the cell housing.

It is to be understood that other modifications and changes to the preferred embodiment of the invention herein shown and described can also be made without departing from the spirit and scope of the invention.

What is claimed is:

1. A galvanic cell having a consumable negative electrode (anode), a positive electrode (cathode) that expands during cell discharge or as the result of abusive discharge, a separator between said negative electrode and said positive electrode, and an electrolyte housed within a two-part conductive container, the first part of the conductive container being electronically connected to the negative electrode, the second part of the container being electronically connected to the positive electrode and wherein said first part and said second part of the container are electronically insulated from each other; the improvement wherein a conductive member is disposed between the negative electrode and the first part of the container, said conductive member being electronically connected to the first part of the container and having at least one segment embedded within the negative electrode such that upon partial electrochemical consumption of the negative electrode and expansion of the positive electrode to a predetermined amount during discharge of the cell, the protruded segment of the conductive member will be disposed to contact the positive electrode so as to internally short the cell.

2. The galvanic cell of claim 1 wherein the conductive member comprises a flat base having at least one projection the plane of which is disposed between about 45 and about 135 degrees to the plane of the base.

3. The galvanic cell of claim 1 wherein the conductive member comprises a flat base having substantially at its center a surface disturbance forming a distending segment the plane of which is disposed between about 45° and about 135° to the plane of the base.

4. The galvanic cell of claim 1 wherein the conductive member is an L-shaped member, one leg of which is tapered.

5. The galvanic cell of claim 1 wherein the conductive member comprises a rectangular strip having distending from its ends segments disposed substantially perpendicular to the plane of the rectangular strip.

6. The galvanic cell of claim 1 wherein the conductive member comprises a flat base having a segment extending from its center disposed approximately perpendicular to the plane of the base.

7. The galvanic cell of claim 1 wherein the positive electrode is selected from the group consisting of $CF_x$, $V_2O_5$, $WO_3$, $MoO_3$, lead oxides, cobalt oxides, $MnO_2$, copper oxides, $CuS$, $CoS_2$, $In_2S_3$, $FeS$, $FeS_2$, $NiS$, $Ag_2CrO_4$, $Ag_3PO_4$ and $CuSO_4$ and wherein the negative electrode is selected from the group consisting of lithium, sodium, potassium, calcium, magnesium and alloys thereof.

8. The galvanic cell of claim 7 wherein the positive electrode is $FeS_2$ and the negative electrode is lithium.

9. The galvanic cell of claim 7 wherein the positive electrode is $CuO$ and the negative electrode is lithium.

10. The galvanic cell of claim 7 wherein the positive electrode is $Pb_3O_4$ and the negative electrode is lithium.

11. The galvanic cell of claim 7 wherein the positive electrode is $PbO$ and the negative electrode is lithium.

12. The galvanic cell of claim 7 wherein the positive electrode is $MnO_2$ and the negative electrode is lithium.

13. The galvanic cell of claim 7 wherein the positive electrode is $Ag_2CrO_4$ and the negative electrode is lithium.

14. The galvanic cell of claim 7 wherein the positive electrode is CuS and the negative electrode is lithium.

15. The galvanic cell of claim 7 wherein the positive electrode is $V_2O_5$ and the negative electrode is lithium.

16. The galvanic cell of claim 1 wherein the positive electrode is $MnO_2$ and the negative electrode is zinc.

17. The galvanic cell of claim 1 wherein the conductive member is made of a material selected from the group consisting of nickel, stainless steel, aluminum, and nickel-plated steel.

18. The galvanic cell of claim 17 wherein the conductive member is nickel.

* * * * *